United States Patent [19]

Andral et al.

[11] 3,933,992

[45] Jan. 20, 1976

[54] PROCESS FOR AUTOMATED REGULATION OF SULFUR PRODUCTION UNITS

[75] Inventors: Guillaume Andral, Pau; Michel Carmassi, Mazeres-Lezons; Bernard Louvel, Buros; Jacques Maurice, Mourenx; Georges Vandesande, Argagnon, all of France

[73] Assignee: Societe Anonyme dite: Societe Nationale Des Petroles D'Aquitaine, Paris, France

[22] Filed: Apr. 8, 1974

[21] Appl. No.: 458,900

Related U.S. Application Data

[63] Continuation of Ser. No. 207,790, Dec. 14, 1971, abandoned.

[30] Foreign Application Priority Data

Dec. 18, 1970 France .................................. 70.45812

[52] U.S. Cl. ............................... 423/573; 23/255 R
[51] Int. Cl.² ........................................... C01B 17/02
[58] Field of Search ............ 423/573, 571, 574, 576; 23/253 E, 255 E, 255 R, 232

[56] References Cited

UNITED STATES PATENTS

| 3,026,184 | 3/1962 | Karaser | 423/573 |
|---|---|---|---|
| 3,219,415 | 11/1965 | Hensley | 423/574 |
| 3,312,529 | 4/1967 | Evand | 423/576 |
| 3,424,560 | 1/1969 | Carmassi et al. | 23/255 E |
| 3,871,831 | 3/1975 | Andral et al. | 23/255 R |

OTHER PUBLICATIONS

Opekar, P. et al.; How A Computer Can Optimize Sulfur–Plant Design Operations; in Oil & Gas Journ., May 1966, pp. 86–89.

*Primary Examiner*—Walter R. Satterfield
*Attorney, Agent, or Firm*—David A. Blumenthal; Arthur Schwartz

[57] ABSTRACT

A process for automated regulation of a unit producing sulphur by oxidation of hydrogen sulphide, in which the flow of gas carrying oxygen into the unit is regulated so as to keep an operating parameter, based on measurement of the sulphurous compound of the residual gases, level with a reference value.

It is characterized by the fact that the control signal, used to regulate the flow of gas containing oxygen at the unit inlet, is a combination of a signal based on measurements taken at the inlet, and representing the theoretical flow of this gas needed to keep the operating parameter at its reference level and another signal representing the correction needed in this flow to adjust the instantaneous value of the parameter to the reference level.

This process allow better control of the sulphur unit, with increased efficiency and reduced atmospheric pollution.

5 Claims, 1 Drawing Figure

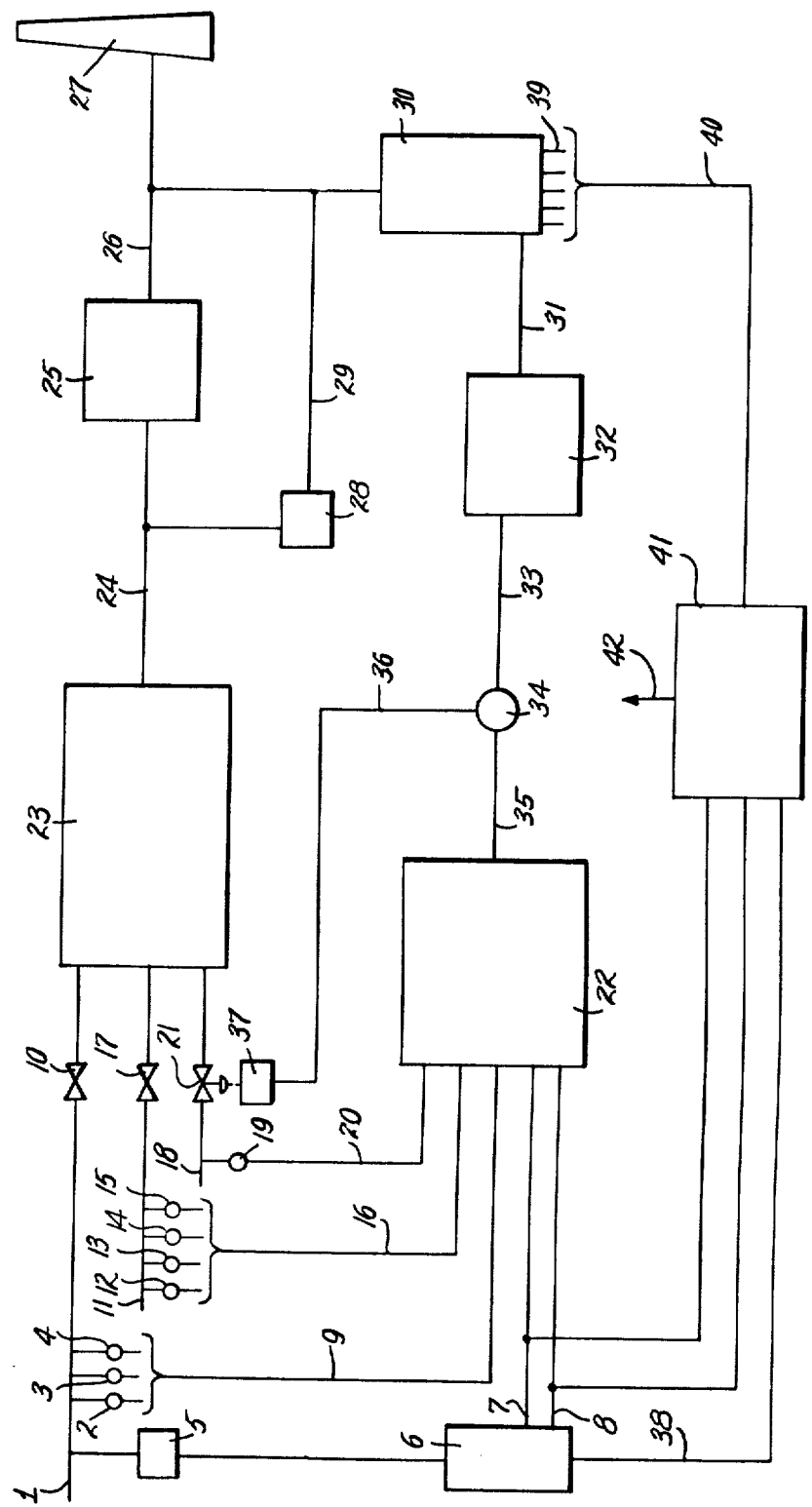

PROCESS FOR AUTOMATED REGULATION OF SULFUR PRODUCTION UNITS

This is a continuation of application Ser. No. 207,790, filed Dec. 14, 1971, and now abandoned.

This invention concerns an improved process and device for automated regulation of units producing sulphur by oxidation of hydrogen sulphide.

A common way of preparing sulphur is the Claus process, which consists of controlled oxidation of hydrogen sulphide, using oxygen or air, followed by contact with a catalyst. The gas containing the hydrogen sulphide, also called acid gas, is injected into a combustion chamber in which one third of the hydrogen sulphide is converted into sulphur dioxide in the presence of oxygen or air, and some sulphur is formed. The reactive gas mixture leaving the combustion chamber is cooled and sent to a condenser, where the sulphur is separated by condensation. In order to increase output, the gas leaving the condenser is reheated and passes over a catalyst, whereupon the sulphur dioxide reacts with the hydrogen sulphide to form a further quantity of sulphur. Catalytic conversion usually requires two or three converters, each preceded by a heater for the gas, and followed by a condenser in which the sulphur is separated out. The residual gases leaving the last catalytic converter and containing small amounts of sulphurous compounds such as hydrogen sulphide, sulphur dioxide, sulphur vapour, sulphur vesicles, carbon bisulphide, carbon oxysulphide, may go through a purification installation, which retains a high proportion of these compounds. In the rest of this description, "sulphur unit" refers to a plant functioning on this principle, with or without a purification installation for the residual gas from the final catalytic converter. The effluents from the unit pass through an incinerator, before being discharged into the atmosphere.

The main requirement for sulphur units is to maintain maximum output, with the lowest possible wastage of sulphur and sulphurous compounds, under chosen reaction conditions, and despite variations in these conditions, such as pressure, temperature, reagent concentration. Automated regulation of such a unit consists of taking action in order to keep an operating parameter at a level corresponding to minimum wastage of sulphur and its compounds, under the conditions chosen.

One existing method of providing this regulation involves the principle of negative feedback. The ratio of acid gas to air in the input flow is adjusted, using a control function based on a parameter which represents the overall hydrogen sulphide and sulphur dioxide content of the residual gas from the unit, so as to reduce this parameter to the lowest possible level.

This method is not entirely satisfactory, since it ignores outside factors affecting the sulphur unit, causing rapid fluctuations in the operating parameter, too fast for the measurement process to take account of them. The result is that information concerning such fluctuations is incomplete so that the unit fails to function at maximum efficiency.

The present invention offers a solution to these drawbacks, by providing a method of regulating sulphur units which helps to reduce rapid fluctuations in the operating parameter, thus allowing regulation of such units to be better adapted to their dynamics. There is a resulting improvement in output, and a correspondingly lower concentration of sulphurous compounds discharged into the atmosphere, thus reducing atmospheric pollution.

The invention concerns a process for automated regulation of a sulphur unit producing sulphur by oxidation of hydrogen sulphide, using a gas containing free oxygen, in which the ratio of the flow of gas containing hydrogen sulphide to the flow of gas containing oxygen is adjusted at the unit inlet, by regulating the flow of gas containing oxygen, in order to keep an operating parameter, based on the sulphurous compound contents of effluents from the unit, at a given level, and in which a signal, representing the theoretical flow of gas containing oxygen needed to keep the operating parameter at its given level is worked out from measurements of the gases containing hydrogen sulphide and oxygen at the unit inlet, another signal, representing the correction needed in the flow of gas containing oxygen, to adjust the instantaneous value of the parameter to the given level, is worked out from this instantaneous value, obtained by analysing the residual gas from the sulphur unit, the two signals are combined, and the resulting signal is used to regulate the input flow of gas containing oxygen.

According to one feature of the invention, the operating parameter used to regulate the sulphur unit is the molar ratio of hydrogen sulphide to sulphur dioxide in the residual gas from the unit.

According to another feature of the invention, the operating parameter used to regulate the sulphur unit is the sum of the hydrogen sulphide and sulphur dioxide contents of the effluents from the unit.

According to a recommended embodiment of the invention, the flow of gas containing oxygen is regulated by varying a slight additional flow, which is combined with a larger fixed flow.

The signal representing the theoretical flow of gas containing oxygen needed to keep the operating parameter at its given level is obtained from a mathematical model simulating the functioning of the sulphur unit, involving measurements of the input flow, pressure, temperature and composition of the gas containing hydrogen sulphide, and the input flow, temperature, pressure and moisture content of the gas containing oxygen. Depending on the method of regulating the flow of this gas, the signal represents the total theoretical flow or the additional theoretical flow needed to keep the operating parameter at a given level.

According to one embodiment of the invention, the rate of conversion of hydrogen sulphide into sulphur is also worked out continuously, from the input composition of the gas containing hydrogen sulphide, and the composition of the residual gas at the outlet. This measurement can be used to improve regulation of the sulphur unit.

The device embodying the process according to the invention consists of a forecasting calculator which delivers a signal representing the theoretical flow of gas containing oxygen needed to keep the operating parameter at a given level, an instrument for sampling the effluents from the unit, a device to analyse these samples, and supply signals representing the amounts of various compounds present in the residual gases, a compensating calculator, which uses the signals from the analysing device to obtain the instantaneous value of the operating parameter and from it a signal representing the correction needed in the flow of gas containing oxygen to adjust the instantaneous value of the parameter to its given level, means of combining the signals from the forecasting and compensating calculators, means of regulating the flow of gas containing oxygen in accordance with the resulting combined signal, and means of measuring the input properties of the gas containing hydrogen sulphide and the gas containing oxygen and supplying the forecasting calculator with signals representing these properties, which allow the signal representing the theoretical flow of gas containing oxygen to be obtained.

The system for regulating the flow of gas containing oxygen includes, in particular, a servomechanism controlling a valve on the inlet pipe for this gas.

In one recommended embodiment, this valve is placed on an additional inlet pipe, with a smaller capacity than the main pipe.

The system for measuring the properties of the gas containing hydrogen sulphide and the gas containing oxygen consists of suitable sensing devices placed on the inlet pipes for these gases, and of an analyser fitted to the pipe for the gas containing hydrogen sulphide. This analyser is preferably a chromatography apparatus, although any other type with equivalent precision and capacity may be used.

The device for sampling the residual gas consists of a sampling tube with an aperture along one generatrix projecting into the residual gas pipe, and leading into a circuit through which the sample flows, and a heating system to keep the tube and circuit at a temperature above the solidifying point of sulphur.

The analysing device accompanying the sampling device may be any analyser with satisfactory precision and capacity. It is preferably a chromatography apparatus equipped with a sample input device separate from the chromatographic column, a storage system for the peaks detected, and a programmer. The sample-input device, which is an adjustable inlet-tap, is placed in a heated, insulated enclosure, the temperature of which is above the solidifying point of sulphur.

The compensating calculator consists of a device to obtain the instantaneous value of the operating parameter from signals supplied by the analyser, a filtration device to obtain the average instantaneous value, and a calculating device which works out, from the filtered signal and the signal representing the reference value, the feedback control signal. This device preferably takes proportional, integral and first and second pseudo-differential coefficients into account.

In one embodiment of the invention, the device also includes a system to calculate the rate of conversion of hydrogen sulphide into sulphur, receiving signals from the analyser of the input flow of gas containing hydrogen sulphide, and from the analyser of the residual gas, and supplying a signal representing the rate of conversion.

The invention is explained in the following description, illustrated by the accompanying FIGURE, without being in any way confined to this embodiment.

The FIGURE shows, diagrammatically, a sulphur unit equipped with a regulating device according to the invention, using as the operating parameter the theoretical molar ratio of hydrogen sulphide to sulphur dioxide in the residual gases, and also including a system to calculate the rate of conversion of hydrogen sulphide into sulphur.

The gas containing hydrogen sulphide, known as the acid gas, and which also contains carbon dioxide and small amounts of other products such as methane, arrives by a pipe 1, on which are fitted a flowmeter 2, pressure-gauge 3, temperature-gauge 4, and sampling device 5. The sample later returns to the pipe 1 by another pipe (not shown here). The acid gas is sampled by the sampling device 5, and analysed in an analyser 6, preferably a chromatography apparatus equipped with a programmer and a storage system allowing the results to be stored between each analysis cycle. This analyser delivers the results of the analysis in the form of electrical signals 7, 8 and 38, representing the hydrogen sulphide, methane and carbon dioxide contents of the gas. The acid gas reaches the sulphur unit 23, through a valve 10.

A main air flow arrives by a pipe 11, on which are fitted a flowmeter 12, pressure-gauge 13, temperature-gauge 14 and humidity-gauge 15, and enters the sulphur unit through a valve 17. An additional air pipe 18, equipped with a flowmeter 19, allows the amount of air needed to correct disturbances to enter the unit through another valve 21.

A forecasting calculator 22, receives the information from the sensing devices 2, 3 and 4 on the acid-gas pipe along lines 9, information from the sensing devices on the main air-pipe along lines 16, the signal from the flowmeter 19 on the additional air-pipe along line 20, and the signals from the analyser 6, representing the hydrogen sulphide and methane contents of the acid gas, along lines 7 and 8.

From this data, the forecasting calculator obtains an output signal 35, which represents the theoretical additional amount of air needed to keep the operating parameter (the molar ratio of hydrogen sulphide to sulphur dioxide in the residual gases) at a given level. If the composition of the acid gas is known, from previous experience, the analyser 6 can be left out, and the results of the earlier analysis fed directly into the forecasting calculator 22.

Residual gases, containing nitrogen, carbon dioxide, water vapour and small amounts of sulphurous compounds such as hydrogen sulphide, sulphur dioxide, carbon bisulphide and carbon oxylsulphide, escape from the sulphur unit 23 by a pipe 24, and pass into an incinerator 25, the effluent from which passes along a pipe 26 and is discharged into the atmosphere through a chimney 27.

A sampling device 26 in the discharge pipe 24, just before the incinerator inlet, takes a sample of the residual gases. This is done by means of a tubular rod with an aperture among one generatrix, projecting into the middle of the pipe. This sample passes along a pipe 29 to an analyser 30, and back to the pipe 26. The flow ensures short response time. To avoid clogging, the circuit along which the sample flows to the analyser 30 and the pipe 26 are kept above the solidifying point of sulphur, by means of a double casing inside which a heating fluid, such as steam, circulates at a suitable temperature.

The analyser 30 is a chromatography apparatus equipped with a programmer and a peak-storage system, updated at each cycle. The apparatus also includes a sample-input system designed to operate at high temperatures, and which is separate from the chromatographic column, making it accessible in the event of an accident. This input system is an adjustable tap, and it is placed in a heated, insulated enclosure. This system allows the sample, which is at low pressure, to mix with the vector gas circulating at high pressure. The filling of the column enables all the components of the residual gas samples to be analysed, in spite of their high moisture content. Peaks corresponding to hydrogen sulphide, sulphur dioxide, carbon bisulphide and carbon oxylsulphide are measured every four minutes or so.

The signals representing the hydrogen sulphide and sulphur dioxide contents delivered by the chromatograph storage system are fed by lines 31 into a compensating calculator 32, which gives a signal representing the molar ratio of hydrogen sulphide to sulphur dioxide, filters it to obtain an average, compares this average with the reference value of the operating parameter, posted on the calculator, and finally obtains an output signal 33 from the difference, using a specific regulation algorithm adapted to the dynamics of the unit, and taking the proportional, integral and first and second pseudo-differential coefficients in particular into account.

The signal 33, which represents the flow of air needed to bring the instantaneous level of the ratio of hydrogen sulphide to sulphur dioxide back to its given level, forms the negative feedback control algorithm.

The signal 33 from compensating calculator 32, and the signal 35 from the forecasting calculator 22 are combined in an adaptation device 34, and the resulting signal 36 operates a servomechanism 37, which adjusts the setting of the additional air-inlet valve 21.

The information supplied by the analysers 6 and 30 can also be used to obtain the rate of conversion of hydrogen sulphide into sulphur. To do this, a calculating system 41 receives the signals 7, 8 and 38 from 6, representing the hydrogen sulphide, methane and carbon dioxide contents of the input acid gas and, along lines 40, the signals 39 from the chromatography apparatus 30, representing the hydrogen sulphide, sulphur dioxide, carbon bisulphide, carbon oxysulphide and carbon dioxide contents of the residual gases. From these signals the calculating system 41 works out a signal representing the molar ratio of hydrogen sulphide to carbon dioxide and methane in the acid gas, and a second signal representing the molar ratio of sulphurous compounds to carbon dioxide in the residual gases, then divides the second signal by the first, and subtracts the signal obtained from a unitary signal, to obtain a result signal 42, which shows the rate of conversion of hydrogen sulphide into sulphur. This signal may be used in an additional feedback loop, to improve regulation of the sulphur unit.

Display and recording systems (not shown here) allow the different measurements and calculated signals to be displayed, so that the state of operation of the unit may be checked at any time.

What is claimed is:

1. A process for regulating the production of sulphur in a sulphur unit producing sulphur by oxidation of hydrogen sulfide by means of a free oxygen-containing gas and liberating residual gases containing $H_2S$ and $SO_2$, said method comprising the steps of:
    a. feeding a hydrogen sulfide-containing gas and a free oxygen-containing gas to the inlet of the sulphur unit;
    b. automatically analyzing the hydrogen sulfide-containing gas fed to the sulphur unit for its hydrogen sulfide content and providing electrical signals indicative of said $H_2S$ content,
    c. electronically computing from said electrical signals the theoretical flow of oxygen-containing gas needed to oxidize the hydrogen sulfide of the hydrogen sulfide-containing gas to sulphur to keep the $H_2S : SO_2$ molar ratio in the residual gases to a predetermined value and providing a signal representative of said theoretical flow,
    d. automatically analyzing the residual gases obtained from the sulphur unit for their $H_2S$ and $SO_2$ contents and providing residual gas electronic signals indicative of said residual gas contents,
    e. electronically computing from said residual $H_2S$ and $SO_2$ content electronic signals the instantaneous value of the $H_2S : SO_2$ molar ratio in the residual gases and deriving from the difference of said instantaneous and predetermined values a correction signal representative of the correction flow of oxygen-containing gas to bring back the instantaneous value of the $H_2S : SO_2$ molar ratio in the residual gases to the predetermined value,
    f. electronically adding the signals representative of the theoretical flow of oxygen containing gas and the correction flow signal for providing a resulting signal, and
    g. adjusting the ratio of the flow of $H_2S$ containing gas to the flow of oxygen-containing gas by varying the flow of oxygen-containing gas in response to the resulting signal,
    whereby the instantaneous value of the $H_2S : SO_2$ molar ratio in the residual gas is adjusted to the predetermined value.

2. A process for the regulation of production of sulphur in a sulphur unit as recited in claim 1 further comprising the steps of:
    feeding a main stream of oxygen-containing gas into said sulphur unit at a fixed flow rate, and
    feeding an additional stream of oxygen-containing gas into said sulphur unit at a variable flow rate, said variable flow rate responsive to the resulting signal.

3. A process for regulating the production of sulphur in a sulphur unit as recited in claim 1 further comprising the steps of:
    automatically measuring flow rate, pressure and temperature of said $H_2S$ containing gas,
    automatically measuring flow rate, pressure, temperature and humidity of said free oxygen-containing gas, and
    electronically computing said theoretical flow of oxygen-containing gas from the $H_2S$ content of said $H_2S$ containing gas and the values representative of said measurements.

4. A process for regulating the production of sulphur in a sulphur unit as recited in claim 1 further comprising the steps of:
    electronically computing the rate of conversion of the hydrogen sulphide into sulphur from the $H_2S$ content of the hydrogen sulphide containing gas fed to the sulphur unit and the content of the sulphurous compounds in the residual gases from said sulphur unit.

5. In a process for making sulphur in a sulphur unit from the oxidation of hydrogen sulfide utilizing a free oxygen-containing gas said process liberating residual gases containing $H_2S$ and $SO_2$, a method of adjusting the flow rate of the free oxygen-containing gas fed into the sulphur unit comprising the steps of:
    a. feeding a hydrogen sulfide-containing gas and a free oxygen-containing gas to the inlet of the sulphur unit;
    b. automatically analyzing the hydrogen sulfide-containing gas fed to the sulphur unit for its hydrogen sulfide-content and providing electronic signals indicative of said $H_2S$ content, c. electronically computing from said electrical signals the theoretical flow of oxygen-containing gas needed to oxidize the hydrogen sulfide of the hydrogen sulfide-containing gas to sulphur to keep the $H_2S : SO_2$ molar ratio in the residual gases to a predetermined value and providing a signal representative of said theoretical flow, d. automatically analyzing the residual gases obtained from the sulphur unit for their $H_2S$ and $SO_2$ contents and providing residual gas electronic signals indicative of said residual gas contents, e. electronically computing from said residual $H_2S$ and $SO_2$ content electronic signals the instantaneous value of the $H_2S : SO_2$ molar ratio in the residual gases and deriving from the difference of said instantaneous and predetermined values a correction signal representative of the correction flow of oxygen-containing gas to bring back the instantaneous value of the $H_2S : SO_2$ molar ratio in the residual gases to the predetermined value, f. electronically adding the signals representative of the theoretical flow of oxygen containing gas and the correction flow signal for providing a resulting signal, and g. adjusting the ratio of the flow of $H_2S$ containing gas to the flow of oxygen-containing gas by varying the flow of oxygen-containing gas in response to the resulting signal, whereby the instantaneous value of the $H_2S : SO_2$ molar ratio in the residual gas is adjusted to the predetermined value.

* * * * *